May 10, 1960   E. P. BROWNING   2,935,883
CONTROL FOR VEHICLE POWER STEERING AND THE LIKE
Filed June 6, 1958

INVENTOR.
E. P. BROWNING

United States Patent Office 2,935,883
Patented May 10, 1960

2,935,883
CONTROL FOR VEHICLE POWER STEERING AND THE LIKE

Edgar P. Browning, Cedar Falls, Iowa, assignor, by mesne assignments, to Deere & Company, a corporation of Delaware Application June 6, 1958, Serial No. 740,242

8 Claims. (Cl. 74—388)

This invention relates to vehicle power steering and similar mechanisms and more particularly to an improved control therefor.

The invention aims primarily to afford an improvement on the power steering systems forming the subject matter of U.S. patents to Worthington et al. 2,762,446 and Ethington et al. 2,809,532. In each of those cases, a power steering valve is actuated in response to relative movement between a temporarily fixed worm and a turnable control part, the two being interconnected by a cam device in the form of a partial helix in the worm and a follower in the control part. Resistance of the wheels to turning temporarily fixes the worm and when the control part is turned, the follower travels along the helix and causes axial shifting of the control part. The control part is in turn connected to a hydraulic valve which ports fluid to the proper side of the steering motor. When the wheels are thus turned by the motor, the helix catches up with the follower and returns the valve to neutral.

Experience has shown that some malfunctioning of the valve in a system of this type can occur because of wear between the helix and the follower. According to the present invention, the problem involved in replacing one or the other or both of these parts is eliminated by the provision of a novel mechanism for adjusting the width of the helix to compensate for wear and also to provide a proper adjustment upon initial installation. It is a feature of the invention to provide the worm in the form of a hollow member having at its rear end a cam surface which forms part of the helix. The hollow part or bore of the worm carries a shaft having an enlarged head which forms a cooperative wall or face of the helix. The shaft is axially slidably but non-rotatably carried in the worm and means is afforded for adjusting the shaft axially relative to the worm to obtain the proper adjustment. It is a feature of the invention to provide simple adjusting means, such means as may be readily accessible from a convenient location on the vehicle, and suitable means for locking the adjustment once it has been selected.

The foregoing and other important objects and desirable features inherent in and encompassed by the invention will become apparent as a preferred embodiment thereof is disclosed by way of example in the ensuing description and accompanying sheet of drawings, the several figures of which are described immediately below.

Figure 1:
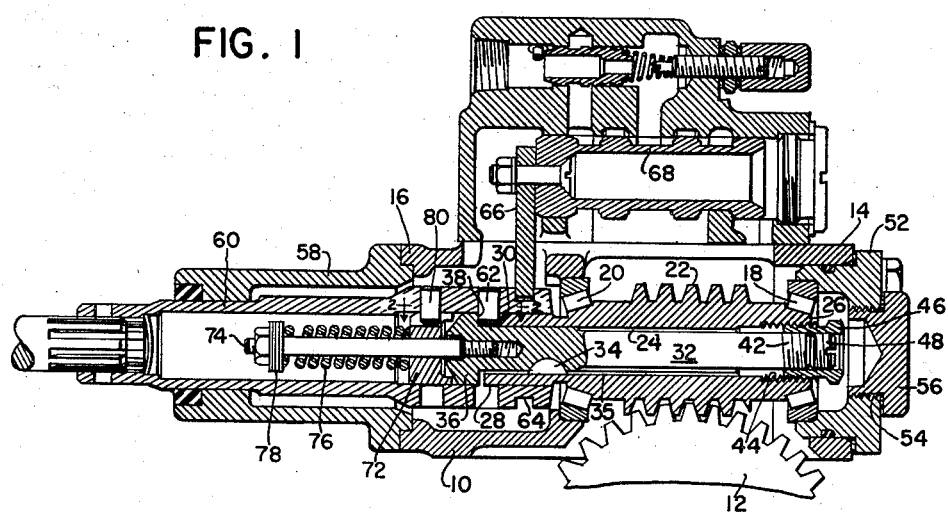
Fig. 1 is a longitudinal section through a typical steering mechanism embodying one form of the invention.

Familiarity with the above identified patents will be assumed. Accordingly, the following description will refer only briefly to basic components of the steering mechanism, a major part of which comprises a support or housing 10 in which a worm wheel or equivalent steerable element 12 is appropriately supported. In a typical construction, the worm wheel 12 is connected to a steerable front truck or to any other shaft having ultimate connections to steerable wheels. The support 10 has front and rear ends 14 and 16 respectively and journals, by means of front and rear bearings 18 and 20, a toothed steering member in the form of a worm 22 which constantly meshes with the worm wheel 12. The bearings 18 and 20 journal the worm 22 for rotation about a fore-and-aft axis, and also hold the worm against shifting along this axis.

At this point, it should be noted that such expressions as "front" and "rear" are used as terms of convenience and not of limitation, being based primarily on the adaptation of the preferred structure to a vehicular environment such as disclosed in the patents referred to above.

The worm 22 has an axial bore 24 therethrough, and this bore opens respectively at the front and rear ends 26 and 28 of the worm. The rear end of the worm has means rigid thereon, such as an integral part thereof, forming a first rearwardly facing generally radial cam face 30 inclined as part of a helix about the worm axis.

Figure 2:
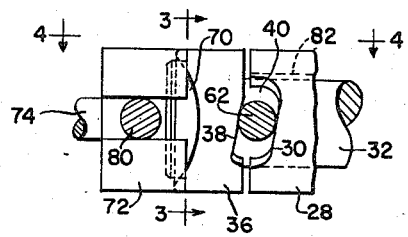
Fig. 2 is an enlarged plan view as seen generally along the line 2—2 of Fig. 1.

A shaft 32 extends axially slidably but non-rotatably through the bore 24 of the worm 22, and is keyed to the worm by means of a key 34 in the shaft 32 and a keyway 35 in the bore 24. Any other suitable connection equivalent to the key may be used. The shaft has an integral enlarged rear head 36 which has a forwardly facing second generally radial cam face 38 parallel to and spaced rearwardly of the first cam face 30 on the member rear end 28 so that the two faces 30 and 38 combine to afford a partially helical cam groove 40 (Fig. 2).

The rear end of the shaft 32 is established by the head 36, and the forward end of the shaft, at 42, is proximate to the forward end 26 of the worm 22, and additionally is externally threaded as shown. The forward part of the worm bore 24 is enlarged and is internally threaded at 44 to combine with the external threading at 42 on the shaft 32 to form part of the adjusting means for adjusting the shaft 32 axially relative to the worm 22. Another part of the adjusting means comprises an adjusting member in the form of an internally and externally threaded nut 46, the external threads of which mesh with the internal thread 44 of the worm and the internal threads of which mesh with the external threads 42 on the shaft 32. The threading at 42 and 44 is of different pitches so that when the nut 46 is turned, the shaft 32 will be axially propelled or repelled relative to the worm 22, it being remembered that the two are keyed together at 34 so that they have no relative rotation.

Once the adjustment is selected, on the basis of the appropriate fore-and-aft width of the cam groove 40, the adjustment is fixed by a lock element 48 which is coaxially threadedly received in an internally tapped portion of the nut 46 which projects forwardly beyond the front end of the shaft 32. When the adjustment is selected and the lock nut 48 is tightened, the worm and shaft operate as one.

The housing 10 has its forward end portion 14 in surrounding relation to the adjusting means 42—44—46—48 and carries a removable cap 52 which supports the front bearing 18. In order that rearward access may be had to the adjusting means, the cap 52 has a tapped bore 54 therein which receives a threaded cap 56, the latter thus affording a removable closure for the access opening established by the tapped bore 54.

Figure 5:
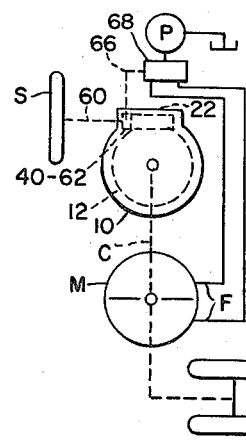
Fig. 5 is a schematic view of a representative steering circuit.

The housing has a rearward extension 58 which journals a steering sleeve 60, which functions as a control part. A forward portion of the sleeve 60 coaxially surrounds the rear ends 28 and 36 of the worm and shaft and rigidly carries a pin 62 which is received or rides in the cam groove 40. The sleeve 60 is carried by the extension 58 so that it is mounted for movement both angularly and axially relative to the worm-shaft unit 22—32. Hence, when the resistance to turning of the worm wheel 12 temporarily fixes the worm-shaft unit and the sleeve 60 is turned, as by a conventional steering wheel (not shown), the result is that the pin 62 rides the helix in one lateral direction or the other and because of the helix the sleeve 60 is shifted forwardly or rearwardly, depending upon the direction of turning. The forward portion of the sleeve has a groove 64 in which rides a fork 66 having a rigid connection to a valve 68. Thus, shifting of the sleeve 60 by means of the device 40—62 causes shifting of the valve 68 to port fluid to one side or the other of a conventional or otherwise arranged steering motor (not shown). These details are adequately disclosed in the two patents referred to above and need not be elaborated here. However, reference to Fig. 5 will show the basic principles involved. The vehicle has steerable wheel means W connected to power-operated means, here a hydraulic vane motor M. The wheel means and motor are mechanically connected to the worm wheel 12 as shown by the dotted line C. A steering wheel S represents a steering device mechanically connected to the shaft 60 which operates the selectively positionable control means or valve 68 through the parts 40—62—66 to activate and deactivate the motor M. A pump P supplies the operating fluid, and the valve is connected to opposite sides of the motor by fluid lines F.

Also as disclosed in the above identified patents is means for giving the operator a certain amount of "feel" in the steering operation. This means there, as well as here, comprises a rear centering cam 70 on the head 36 of the shaft and a cooperating centering cam 72 coaxially carried on a rearwardly extending rod 74. A spring 76 operates between the centering cam 72 and washer means 78 at the rear of the rod 74. The cam 72 is loosely pinned to the sleeve 60 by a pin 80 so that as the sleeve 60 turns relative to the worm-shaft unit, the cam 72 turns with the sleeve but can yield axially rearwardly as the centering cams tend to separate. The "feel" is afforded by the load imposed by the spring 76 on the centering cams.

Figure 3:
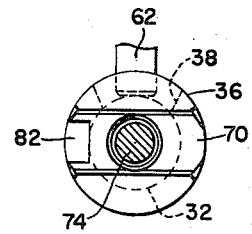
Fig. 3 is a transverse section as seen along the line 3—3 of Fig. 2.
Figure 4:
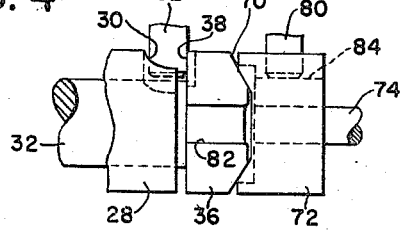
Fig. 4 is an elevation from the opposite side as seen along the line 4—4 of Fig. 2.

Another feature of the invention is the means facilitating installation of the shaft 32. As best shown in Figs. 3 and 4, the rear or head 36 of the shaft 32 has therein a slot or groove 82 which is angularly offset from the cam face 38. The purpose of the slot 82 is to enable rearward insertion of the shaft with the sleeve 60 in place. This is achieved in the following manner. The centering cams 72 and 70 are rotated 90° angularly relative to each other so that the groove 82 in the head 36 is in axial register with the pin 62. The groove in the cam 72, as best shown at 84, will likewise be in register with both pins 62 and 80 so that the assembly comprising the shaft 32, rod 74, centering cam 72, spring 76 and washer assembly 78 may thus be rearwardly inserted. As soon as the head 36 is rearward of the pin 62, the pin 80 will receive the groove 84 in the centering cam 72 and will hold it against turning. The shaft 32 is then forcibly turned to bring the groove 82 to the position shown in Figs. 3 and 4, and the cam face 38 will be in its proper position. The worm is then inserted, with its rear bearing 20 in place. The front bearing 18 is mounted in the cap 52 which is then installed. After appropriate adjustment is made at 42—44—46, the lock nut 48 is tightened and the closure or nut 56 is screwed in place.

The construction afforded according to the invention is extremely simple and overcomes a major problem in manufacture, use and adjustment of steering mechanisms of the character referred to. Features other than those categorically enumerated as well as modifications and alterations therein, together with application of the principles of the invention to mechanism similar to that disclosed, will readily occur to those versed in the art, all of which may be achieved without departure from the spirit and scope of the invention.

What is claimed is:

1. In a power steering system for a vehicle including steerable wheel means, power means connected to and for steering the wheel means, selectively positionable control means for activating and deactivating the power-operated means and a steering device for the control means, the improvement comprising: a vehicle-mounted support having front and rear ends; a toothed steerable element movably carried by the support and connected to and for steering with the wheel means; a toothed steering member meshing with said element and journaled in the support for rotation about but constrained against axial shifting along a fore-and-aft axis, said member having front and rear ends and further having an axial bore therethrough; means rigid on the rear end of the member providing a rearwardly facing generally radial first cam face inclined generally on a helix about said axis; a shaft axially slidably carried in the bore and keyed to the member and having front and rear ends respectively proximate to the front and rear ends of the member; means rigid on the rear end of the shaft providing a forwardly facing second cam face rearwardly spaced from and paralleling the first cam face and combining with said first cam face to afford a cam groove; means cooperative between the front ends of the shaft and member for adjusting the shaft axially relative to the member to vary the fore-and-aft width of the groove; and a control part, having a cam follower received in the groove, and mounted on the support for movement both axially and angularly relative to the member and shaft, said part being connected to the steering device to be turned by said device so as to shift axially as the follower travels in the groove while the member and shaft are held stationary and said part being connected to and for positioning the control means.

2. The invention defined in claim 1, in which: the support has a forward portion surrounding the front ends of the member and shaft and said portion has an opening therein for access to said adjusting means; and a removable closure is provided for said opening.

3. The invention defined in claim 1, in which: the adjusting means comprises a threaded device acting on the shaft and reacting on the member to selectively propel and repel the shaft axially.

4. The invention defined in claim 1, in which: the first cam-face means is an integral rear portion of the member, and the second cam face means is an integral enlarged head on the rear end of the shaft.

5. The invention defined in claim 1, in which: the adjusting means comprises an internal threaded portion at the front end of the member, an externally threaded portion at the front end of the shaft, said portions being of different pitches, and an adjusting member threaded internally and externally to respectively threadedly engage said external and internal portions.

6. The invention defined in claim 5, including: a lock element threadedly engaging one of said portions and the adjusting member to releasably secure the latter against turning.

7. The invention defined in claim 5, in which: the adjusting member is of such length as to project forwardly beyond the front end of the shaft and has a tapped bore coaxial with the shaft, and an externally threaded lock element is threaded into said tapped bore to abut the front end of the shaft.

8. The invention defined in claim 1, in which: the means on the rear end of the shaft has a fore-and-aft slot therein spaced angularly from its cam face to enable rearward insertion of the shaft past the control part cam follower for subsequent rotation of the shaft to bring its cam face into rearward engagement with said follower.

No references cited.